Mar. 3, 1925.  1,528,525

J. BOSNYAKOVITS

BALL BEARING

Filed May 11, 1921  2 Sheets-Sheet 1

Joseph Bosnyakovits INVENTOR

BY

ATTORNEYS

Mar. 3, 1925.                                                                1,528,525
J. BOSNYAKOVITS
BALL BEARING
Filed May 11, 1921                                       2 Sheets-Sheet 2
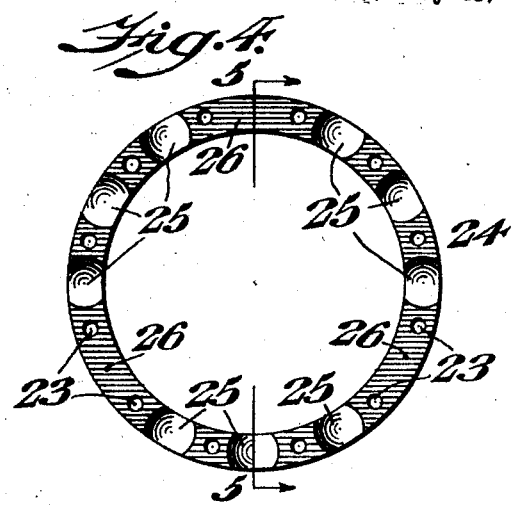
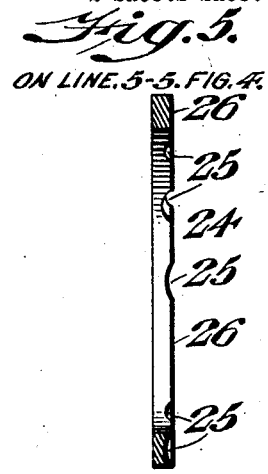
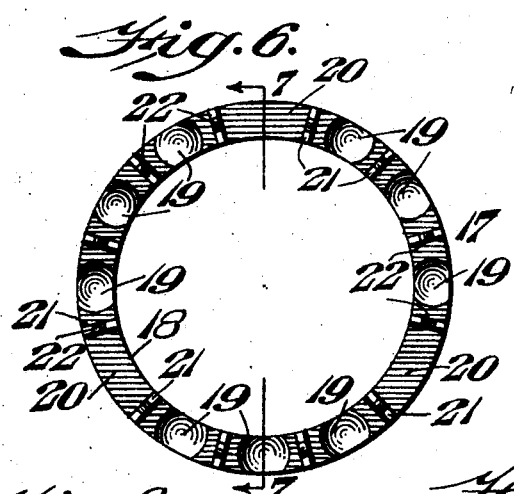
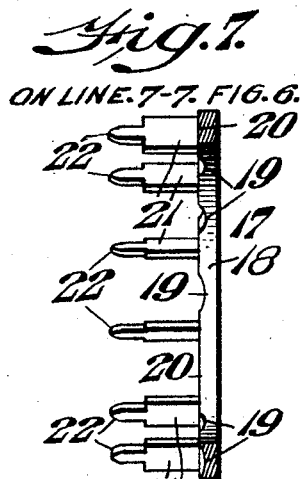
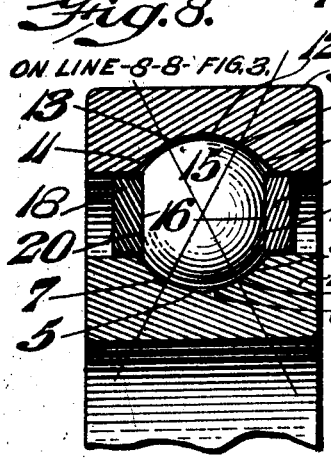
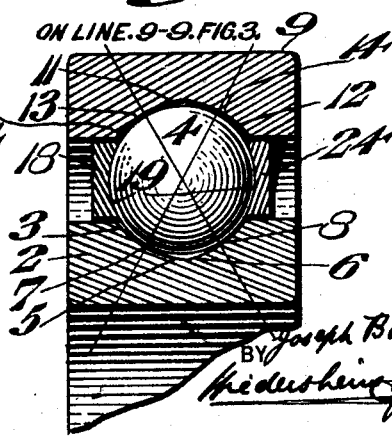
INVENTOR
ATTORNEYS Patented Mar. 3, 1925.

1,528,525

UNITED STATES PATENT OFFICE.

JOSEPH BOSNYAKOVITS, OF MAPLE SHADE, NEW JERSEY.

BALL BEARING.

Application filed May 11, 1921. Serial No. 468,607.

*To all whom it may concern:*

Be it known that I, JOSEPH BOSNYAKOVITS, a citizen of the United States, residing at Maple Shade, in the county of Burlington, State of New Jersey, have invented a new and useful Ball Bearing, of which the following is a specification.

My invention consists of a novel construction of a ball bearing, comprising concentric grooved rings, the sides of said grooves being solid, continuous, uninterrupted and integral throughout their circumference, and the parts being so proportioned and designed that the load balls may be admitted to the grooves or races by displacing the rings relatively or eccentrically to each other, after which the rings are positioned concentrically and the spacing devices inserted, each of the ball races in the juxtaposed rings preferably being struck from different radii centers, so that a four-point bearing is produced, which is especially adapted for use as a thrust bearing, and capable of resisting the thrust in either direction.

It further consists in connection with a ball bearing having the characteristics above recited, of novel means for enabling the entire ball race to be filled with balls, at the same time preserving the feature of the metallically, unbroken, grooved pathway for the outer ball race of the inner ring and the inner ball race of the juxtaposed outer ring, without necessitating the employment of the lateral recesses in one or both of the rings for the insertion of the additional load balls in excess of the number which can be inserted by the eccentric displacement of the rings, so that the bearing is rendered more durable and effective and particularly adapted for high speeds and heavy loads.

It further consists of a novel construction of a ball bearing, wherein the load balls are arranged in a plurality of groups and interposed between said groups are additional balls having the dual function of load balls and spacer balls, the latter having parallel oppositely located faces, in conjunction with the inner and outer rings, each having the continuous, unbroken, integral grooves therein.

It further consists in a ball bearing having the novel characteristics above described, of a novel construction of ball distributing or spacing devices, wherein means are provided for retaining the groups of load balls and spacer balls in their proper relative position, said groups being spaced apart by the additional balls having the duel function of spacing balls and load balls, whereby I am enabled to completely fill the ball race of the bearing rings having the continuous, unbroken, integral grooves therein.

It further consists of a novel construction of ball distributing devices having concave seats and flats thereon, adapted for coaction with groups of load balls and the flats of the intermediate spacer balls which have the duel function of spacing balls and load balls.

It further consists of a novel construction of a four-point bearing, formed of rings having continuous, unbroken, integral grooves constituting ball races, said ball races being completely filled with load balls, the customary number of said load balls being first inserted by the eccentric displacement of the rings, and the remaining annular space between said races being filled by the spacer balls, having the parallel flattened sides, whereby I am enabled to produce a bearing having its entire ball race filled with load balls, and whose rings are not laterally recessed at any point.

It further consists of a novel full race annular bearing, wherein the filling opening is eliminated, and the bearing has a continuous race and uninterrupted grooves, whereby all of the troubles due to interference between balls and filling opening edges, are done away with, said bearing being assembled by positioning the inner race eccentrically to the outer, filling the load balls into the crescent shaped space between the races, then being centered, the load balls then distributed or assembled in groups, the additional spacer balls inserted, and the cage and its adjuncts, being lastly placed in position to maintain the proper distribution, forming a unitary device preventing the balls from rubbing against each other.

It further consists of other novel features of construction, all as will be hereinafter fully set forth.

For the purpose of illustrating my invention, I have shown in the accompanying drawings forms thereof which are at present preferred by me, since they will give in practice satisfactory and reliable results, although it is to be understood that the various instrumentalities of which my invention consists can be variously arranged and organized and that my invention is not limited to the precise arrangement and organization of these instrumentalities as herein shown and described.

Figure 4 represents a plan view of the outer ring or closure which is employed in conjunction with the cage or ball distributing devices.

Figure 5 represents a section on line 5—5 Figure 4.

Figure 6 represents a plan view of the ball distributor employed, in detached position.

Figure 7 represents a section on line 7—7 Figure 6.

Figure 8 represents on an enlarged scale a section on line 8—8 Figure 3.

Figure 9 represents on an enlarged scale a section on line 9—9 Figure 3.

Similar numerals of reference indicate corresponding parts.

Referring to the drawings:—

Figure 1:
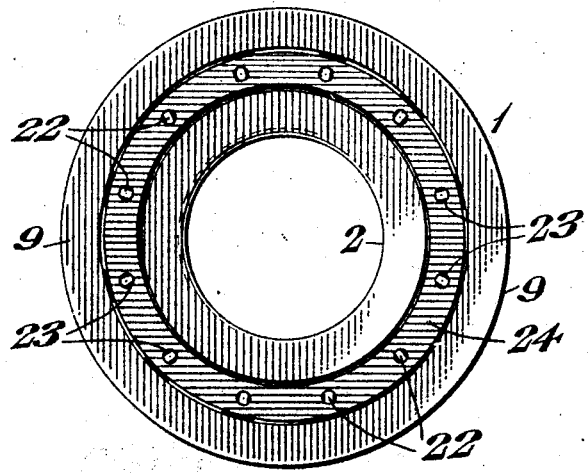
Figure 1 represents a plan view of a ball bearing embodying my invention.

1 designates my novel construction of ball bearing, the same comprising the inner ring 2, having in the outer periphery thereof, the ball race 3, which is in the form of a continuous unbroken groove, whose sides overhang the load balls 4. As will be understood from Figures 8 and 9, the groove or ball race 3 of the inner ring, is preferably of different arcs or curvatures, struck from different radii centers as indicated at 5 and 6, so that two contact points for the load balls 4 are formed on the groove 3, as indicated at 7 and 8 in Figure 8.

9 designates the outer ring, which is provided with the inner continuous and uninterrupted ball race or groove 10, which like the race 3 is preferably struck from different radii, so that two arcs or curvatures 11 and 12 are formed whereby two contact points are formed for the load balls as indicated at 13 and 14 in Figure 8.

Figure 2:
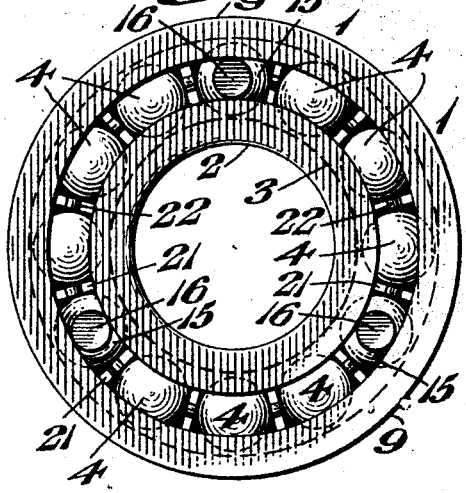
Figure 2 represents a plan view of Figure 1 with the outer closing ring removed.

It will be seen from the foregoing and particularly from the enlarged views in Figures 8 and 9, that by my invention a four point bearing is formed, which enables my novel bearing to be especially adapted for use without alteration as a thrust bearing, wherein the thrust may be exerted in either direction, the bearing being equally adapted for ordinary use and being obviously efficient under heavy loads and high speeds. In the construction seen in Figures 2 and 3, I have shown the load balls 4 as arranged in three groups of three each and interposed between each group. I place the three balls 15, which have parallel flats 16, these balls 15 having the dual function of spacer balls and load balls, and enabling me to completely fill the continuous and uninterrupted ball races 3 and 10 with load balls, which is a very desirable feature in this class of bearings as it renders the bearing more effective and durable as will be apparent to those skilled in this art. These spacer balls 15 are readily inserted by turning them so that their flats 16 will enter the annular space between the rings when they are centered or concentric as seen in Figure 2, after which said balls 15 are turned so that they appear as seen in Fig. 8, the spherical portions of said balls 15 travelling on the contiguous grooves while their parallel flats are retained in proper position at all times by the distributing devices 17 and 24 to be referred to. In order to properly space apart or distribute the load balls, I employ the ball distributing or spacing device or cage 17, seen detached from the bearing in Figures 6 and 7, the same comprising the flat ring 18, having the concavities or partly spherical seats 19 therein arranged in groups of three, as will be understood from Figure 6, so as to accommodate the three groups of load balls 4, while the three flats 20 contact with and retain the contiguous flattened faces 16 of the balls 15 in position, when the parts are assembled.

21 designates short spacing bars for the load balls which project at an angle from the ring 18 and have the terminals 22, which engage the holes 23 in the outer ring 24, whose inner surface is provided with the three groups of concave seats 25, and the three interposed flats 26, which are spaced to align with the corresponding surfaces 19 and 20 of the cage 17, when the parts are assembled.

Figure 3:
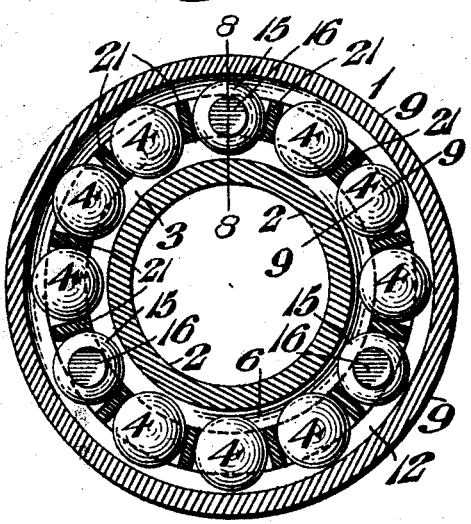
Figure 3 represents a sectional view showing the inner and outer rings and the ball distributing devices in section, the load balls being shown in elevation.

In the assembling of the bearing, the load balls 4 or groups of said load balls are assembled by first eccentrically displacing the inner and outer rings 2 and 9, so as to form a crescent shaped space of sufficient area to permit the introduction of a limited number of load balls 4, nine of such balls being shown in the present instance. It will be understood that the number of load balls which may be inserted by eccentric displacement in a bearing, wherein the grooves or ball races are continuous or unbroken, may be increased or diminished according to requirements or the dimensions of the rings, which are determined by the load rating or duty, the bearing is designed for, said number of load balls capable of insertion by eccentric displacement being one-half the total number of balls that would fill the races plus one. After the load balls 4 which are nine in the present instance are inserted, the ball races or rings are then centered or restored to concentric position, and collocated or positioned, in three groups of three each, as seen in Figures 2 and 3. The balls 15 having the parallel flats are then inserted and turned about or placed in position, as seen in Figures 2 and 3, the parallel flattened faces 16 enabling said balls 15 to be readily inserted between the juxtaposed concentric edges of the rings, when they are centered or in the position seen in Figure 2. The flats of said balls after their insertion being turned so as to appear as seen in Figures 2, 3 and 8, the cage 17 is then placed in position as seen in Figure 2, the nine load balls 4 seating in the nine concavities 19, while the flats 20 of the cage contact with the contiguous flats 16 of the balls 15, as will be understood from Figure 8. The outer ring or closure 24 is next placed in position with the concave seats 25, aligning with the concave seats 19, and the flats 26 then contact with the contiguous flats 16 of the balls 15, and the points 22 align with and engage the holes 23, so that the completed bearing now appears as seen in Figure 1.

It will be seen from the foregoing that each of the rings 2 and 9, has a groove or ball race whose sides continuously overhang the load balls to a slight extent, said rings and the sides of said grooves being continuous and integral, throughout the entire length of the rings. When the elements composing my novel device are assembled and in their normal operative position, the load balls can not escape, since there is at all times present a continuous, metallic, unbroken, grooved pathway for the load balls, which in conjunction with the spacing devices, hold the two rings at all times in concentric assembled condition against axial displacement, so that all the parts are properly held together and form a unitary device.

The construction of my novel bearing obviates the disadvantages of the employment of only the specific number of load balls, which can be inserted in the crescent space between the rings, when the latter are eccentrically displaced from their normal position, which as before stated is one-half the total number of balls that would fill the races plus one, since in my invention, I am enabled to completely fill the ball races by the additional balls 15 which have the dual function of load balls and spacing balls.

It will be understood by those skilled in the art, that while I have shown nine load balls 4, in groups of three each and three spacer balls 15, as being employed, that the precise number of load balls and spacer balls may be varied, according to requirements, which would be determined by the duty to which the bearing is to be put. The spacer balls 15 after being assembled as seen in Figures 2, 3, and 8 serve the function of additional load balls, since they are so positioned that their spherical portions contact with the contiguous surfaces of the inner and outer grooves or ball races 3 and 10, as will be understood from Figure 8 and consequently the same operative spherical surface of each of said spacer balls is at all times functioning to the same extent, as is the case with the load balls 4, as will be understood from Figures 8 and 9.

I am therefore enabled by my invention to produce a ball race bearing having its ball races entirely filled with load balls and at the same time I eliminate the necessity of any lateral filling openings, it being apparent that the continuity of the sides of the grooves or ball race, insures the regular running of the load balls and consequent durability of the bearing, which also enables the bearing to support a greater load than would be the case if there was the interruption of a lateral recess for the insertion of balls in the sides of one or both of the rings.

I am aware of the British patent to Gentry, No. 29,925 of 1897, which discloses the feature of the insertion of antifriction devices between continuous ball races of a pair of rings which may be displaced eccentrically, and I am also aware of the German patent No. 49,071, which discloses the feature of a continuous uninterrupted groove or ball race in both the inner and outer rings of a ball bearing, and I therefore make no claim to these features per se, my claims being directed particularly to the novel concrete unitary structure defined therein.

It will be apparent from Figures 8 and 9, that my invention is adapted not only for use as an ordinary radial or annular bearing, wherein the direction of the load is at right angles or radial to the axis of the shaft, but also as a thrust bearing, wherein the load is parallel to the axis of the shaft or acting at an angle, it being apparent that when my novel device is used as a thrust bearing, the direction of the load may be resisted in either direction, which it may be applied as parallel with or at an angle to the axis of the shaft, it being apparent from Figures 8 and 9, that my device is readily adapted for angular loads, since I have made effective provision for both radial and thrust components.

It is of course desirable in my invention, that all the load balls 4 as well as the spacer balls 15 should be closely alike or identical in size, since it is evident that a load ball larger than its fellows must receive more than its share of the load, and therefore transmit a correspondingly greater pressure to the race resulting in excessive and unsafe loading for both elements, while on the other hand, an under sized ball will be under loaded or not loaded at all, since its fellows having to take its share of the burden must correspondingly carry more than their proportion.

It will now be apparent that I have devised a novel and useful construction of a ball bearing, which embodies the features of advantage enumerated as desirable in the statement of the invention and the above description, and while I have, in the present instance, shown and described preferred embodiments thereof which will give in practice satisfactory and reliable results, it is to be understood that the same is susceptible of modification in various particulars without departing from the spirit or scope of the invention or sacrificing any of its advantages.

Having thus described my invention, what I claim as new and desire to secure by Letters Patent, is:—

1. A bearing comprising two concentric rings, each ring having a groove, both sides of which overhang the balls and are continuous, unbroken and integral throughout their circumference, load balls between said rings, the number of balls, being such that they can be inserted in the space between the rings, when the latter are displaced from normal position, additional spacer balls having flattened parallel sides inserted between groups of said load balls, and distributing devices having concavities and flats therein adapted to contact with the spherical and flattened surfaces of said load balls and spacer balls respectively.

2. A bearing comprising two concentric rings, each ring having a groove, both sides of which overhang the balls and are continuous, unbroken and integral throughout their circumference, load balls between said rings, the number of balls, being such that they can be inserted in the space between the rings when the latter are displaced from their normal position, additional spacer balls having flattened parallel sides inserted between groups of said load balls, and distributing devices having concavities and flats therein adapted to contact with the spherical and flattened surfaces of the load balls and spacer balls respectively, said distributing devices having spacing bars common thereto and interposed between said balls.

3. A bearing comprising two concentric rings, each ring having a groove, both sides of which overhang the balls and are continuous, integral and unbroken throughout their circumference, load balls between said rings, the number of balls being such that they can be inserted between said rings, when the latter are displaced from their normal position, additional spacer balls having parallel flattened sides and adapted to be inserted between the concentric annular surfaces of said rings, when they are centered, a distributing cage having flats and groups of concave seats adapted to contact with the spherical surfaces and flats of said load balls and spacer balls, spacing bars carried by said cage and projecting at an angle therefrom, and an outer closure ring having holes therein engaging the terminals of said spacing bars and the inner surface of said outer ring having concave seats and flats adapted to align with the concave seats and flats of said distributing cage.

4. A bearing comprising two concentric rings, each ring having a groove, both sides of which overhang said balls and are continuous, integral and uninterrupted throughout their circumference, load balls between said rings, the number of balls being such that they can be inserted between the rings, when the latter are displaced from their normal position, additional spacer balls, having parallel, flattened sides and adapted to be inserted between the concentric, annular surfaces of said rings when they are centered, a distributing cage having flats and groups of concave seats adapted to contact with the spherical surfaces and flats of said load balls and spacer balls, spacing bars carried by said cage and projecting at an angle therefrom, and an outer closure ring having holes therein engaging the terminals of the spacing bars and the inner surface of said outer ring having concave seats and flats adapted to align with the concave seats and flats of said distributing cage, the grooves in said rings being struck from different radii, whereby a four-point bearing is formed which is adapted for use as an annular bearing or thrust bearing.

5. The method of manufacturing and assembling a ball bearing into a unitary structure, the parts of which hold each other together, which consists in forming inner and outer rings having opposing grooves, the sides of which are uninterrupted, integral and unbroken throughout their circumference and which are separated by a distance less than the diameter of the load balls when the rings are concentric, placing said rings eccentrically to each other to form a crescent-shaped space between their edges at one side of a width greater than the diameter of said load balls, introducing through said space a limited number of load balls, extending when in contact with each other only partly around the race way formed by said grooves, next centering said rings and restoring them to concentric position, next arranging said load balls in groups, next introducing between said groups spacer balls having their opposite sides parallel and flattened, next turning said spacer balls so that the spherical portions thereof contact with said grooves, and next introducing a spacing device, whereby a full race bearing is provided.

JOSEPH BOSNYAKOVITS.

Witnesses:
 FRED A. BARTON,
 ELISE D'ANECURE.